(12) United States Patent
Merritt et al.

(10) Patent No.: US 10,065,146 B2
(45) Date of Patent: Sep. 4, 2018

(54) METHOD AND APPARATUS FOR WINDING A FILTER ELEMENT

(71) Applicants: Steven J. Merritt, Kearney, NE (US); Kyle Swanson, Lincoln, NE (US)

(72) Inventors: Steven J. Merritt, Kearney, NE (US); Kyle Swanson, Lincoln, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 15/672,049

(22) Filed: Aug. 8, 2017

(65) Prior Publication Data

US 2017/0333824 A1 Nov. 23, 2017

Related U.S. Application Data

(62) Division of application No. 11/634,647, filed on Dec. 6, 2006, now Pat. No. 9,757,676.

(51) Int. Cl.
| | |
|---|---|
| *B01D 46/52* | (2006.01) |
| *B01D 46/00* | (2006.01) |
| *B01D 25/00* | (2006.01) |
| *B01D 25/24* | (2006.01) |

(52) U.S. Cl.
CPC .......... *B01D 46/527* (2013.01); *B01D 25/001* (2013.01); *B01D 25/24* (2013.01); *B01D 46/0001* (2013.01); *B01D 2265/06* (2013.01)

(58) Field of Classification Search
CPC combination set(s) only.
See application file for complete search history.

(56) References Cited

U.S. PATENT DOCUMENTS

| | | | |
|---|---|---|---|
| 1,301,223 | A | 4/1919 | Burlingame |
| 1,700,126 | A | 6/1926 | Goodloe |
| 1,616,874 | A | 2/1927 | Scheffey |
| 1,665,930 | A | 4/1928 | Nixon et al. |
| 1,943,080 | A | 1/1934 | Langston |
| 1,947,066 | A | 2/1934 | Sieg |
| 1,954,881 | A | 4/1934 | List |
| 1,958,126 | A | 5/1934 | Bowen |

(Continued)

FOREIGN PATENT DOCUMENTS

| | | |
|---|---|---|
| JP | 2002/537103 A1 | 11/2002 |
| WO | WO 00/50153 A1 | 8/2000 |

(Continued)

*Primary Examiner* — Bobby Ramdhanie
*Assistant Examiner* — Denise R Anderson
(74) *Attorney, Agent, or Firm* — Reinhart Boerner Van Deuren P.C.

(57) ABSTRACT

A filter apparatus and method utilize a filter element, defining a longitudinal axis and an axial end thereof, and having a central winding structure and a length of fluted filter material wound about the winding structure with the flutes of the media oriented to provide for filtration of fluid passing axially through the filter element. An edge of filter media defines the axial end of the filter element when the media is wound about the winding structure. An axial end of the winding structure is disposed adjacent the axial end of the filter element. A winding feature extends substantially axially outward from the axial end of the winding structure to a distal end of the winding feature. The filter media is wrapped about the winding structure such that the axial end of the filter element is disposed substantially flush with the distal end of the winding feature.

40 Claims, 8 Drawing Sheets

(56) References Cited

U.S. PATENT DOCUMENTS

| | | |
|---|---|---|
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 3,680,806 A | 8/1972 | Obermaier et al. |
| 4,227,953 A | 10/1980 | Wasielewski et al. |
| 4,228,012 A | 10/1980 | Pall |
| 4,252,591 A | 2/1981 | Rosenberg |
| 4,253,228 A | 3/1981 | Easley |
| 4,257,790 A | 3/1981 | Bergquist et al. |
| 4,498,989 A | 2/1985 | Miyakawa et al. |
| 4,579,698 A | 4/1986 | Meyering et al. |
| 4,589,983 A | 5/1986 | Wydevan |
| 4,720,292 A | 1/1988 | Engel et al. |
| 4,747,944 A | 5/1988 | George |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,484,466 A | 1/1996 | Brown et al. |
| 5,543,007 A | 8/1996 | Takagaki et al. |
| 5,588,945 A | 12/1996 | Lauderbaugh |
| 5,609,711 A | 3/1997 | Miller |
| 5,685,985 A | 11/1997 | Brown et al. |
| 5,720,790 A | 2/1998 | Kometani et al. |
| 5,755,843 A | 5/1998 | Sundquist |
| 5,772,883 A | 6/1998 | Rothman et al. |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,022,305 A | 2/2000 | Choi et al. |
| 6,048,386 A | 4/2000 | Gillingham et al. |
| 6,179,890 B1 | 1/2001 | Ramos et al. |
| D437,402 S | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszyk et al. |
| 6,517,598 B2 | 2/2003 | Anderson et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| 6,887,343 B2 | 5/2005 | Schukar et al. |
| 6,893,561 B2 | 5/2005 | Janiek |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 | 12/2005 | Gillingham et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,090,712 B2 | 8/2006 | Gillingham et al. |
| 7,150,903 B2 | 12/2006 | Frey |
| 7,168,573 B2 | 1/2007 | Brown et al. |
| 7,179,317 B2 | 2/2007 | Chung et al. |
| 7,211,124 B2 | 5/2007 | Gieseke et al. |
| 7,252,704 B2 | 8/2007 | Tokar et al. |
| 7,255,300 B2 | 8/2007 | Johnston |
| 7,270,692 B2 | 9/2007 | Gillingham et al. |
| 7,282,075 B2 | 10/2007 | Sporre et al. |
| 7,303,604 B2 | 12/2007 | Gieseke et al. |
| 7,316,723 B2 | 1/2008 | Chung et al. |
| 7,318,851 B2 | 1/2008 | Brown et al. |
| 7,318,852 B2 | 1/2008 | Chung et al. |
| 7,323,029 B2 | 1/2008 | Engelland et al. |
| 7,329,326 B2 | 2/2008 | Wagner et al. |
| 7,338,544 B2 | 3/2008 | Sporre et al. |
| 7,351,270 B2 | 4/2008 | Engelland et al. |
| 7,393,375 B2 | 7/2008 | Xu et al. |
| 7,396,375 B2 | 7/2008 | Nepsund et al. |
| 7,396,376 B2 | 7/2008 | Schrage et al. |
| 7,458,468 B2 | 12/2008 | Desmarais |
| 7,959,703 B2 | 6/2011 | Merritt et al. |
| 8,048,187 B2 | 11/2011 | Merritt et al. |
| 2003/0089654 A1 | 5/2003 | Janiek |
| 2005/0252182 A1 | 11/2005 | Golden et al. |
| 2006/0090431 A1 | 5/2006 | Brown |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0151655 A1 | 7/2006 | Johnston |
| 2006/0163150 A1 | 7/2006 | Golden et al. |
| 2007/0039296 A1 | 2/2007 | Schrage et al. |
| 2007/0175194 A1 | 8/2007 | Nepsund et al. |
| 2007/0186528 A1 | 8/2007 | Wydeven et al. |
| 2007/0193236 A1 | 8/2007 | Merritt |
| 2007/0199285 A1 | 8/2007 | Gieseke et al. |
| 2007/0234903 A1 | 10/2007 | Xu et al. |
| 2007/0261374 A1 | 11/2007 | Nelson et al. |
| 2007/0289265 A1 | 12/2007 | Coulonvaux et al. |
| 2008/0010959 A1 | 1/2008 | Gillingham et al. |
| 2008/0016832 A1 | 1/2008 | Krisko et al. |
| 2008/0022641 A1 | 1/2008 | Engelland et al. |
| 2008/0066434 A1 | 3/2008 | Kuempel et al. |
| 2008/0086990 A1 | 4/2008 | Kuempel et al. |
| 2008/0110142 A1 | 5/2008 | Nelson et al. |
| 2008/0110822 A1 | 5/2008 | Chung et al. |
| 2008/0115470 A1 | 5/2008 | Kuempel et al. |
| 2008/0115758 A1 | 5/2008 | Engelland et al. |
| 2008/0135471 A1 | 6/2008 | Merritt et al. |
| 2008/0209874 A1 | 9/2008 | Gieseke et al. |
| 2008/0216654 A1 | 9/2008 | Wagner et al. |

(56) References Cited

U.S. PATENT DOCUMENTS

2008/0250763 A1 10/2008 Widerski et al.
2008/0250766 A1 10/2008 Schrage et al.

FOREIGN PATENT DOCUMENTS

| WO | WO 2005/058461 A1 | 6/2005 |
| WO | WO 2005/077487 A1 | 8/2005 |
| WO | WO 2005/082484 A1 | 9/2005 |
| WO | WO 2005/0123222 A1 | 12/2005 |
| WO | WO 2006/014941 A2 | 2/2006 |
| WO | WO 2006/017790 A1 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/0145939 A2 | 12/2007 |
| WO | WO 2008/045325 A2 | 4/2008 |
| WO | WO 2008/070702 A1 | 6/2008 |
| WO | WO 2008/095196 A1 | 8/2008 |
| WO | WO 2008/098185 A1 | 8/2008 |
| WO | WO 2008/106375 A2 | 9/2008 |

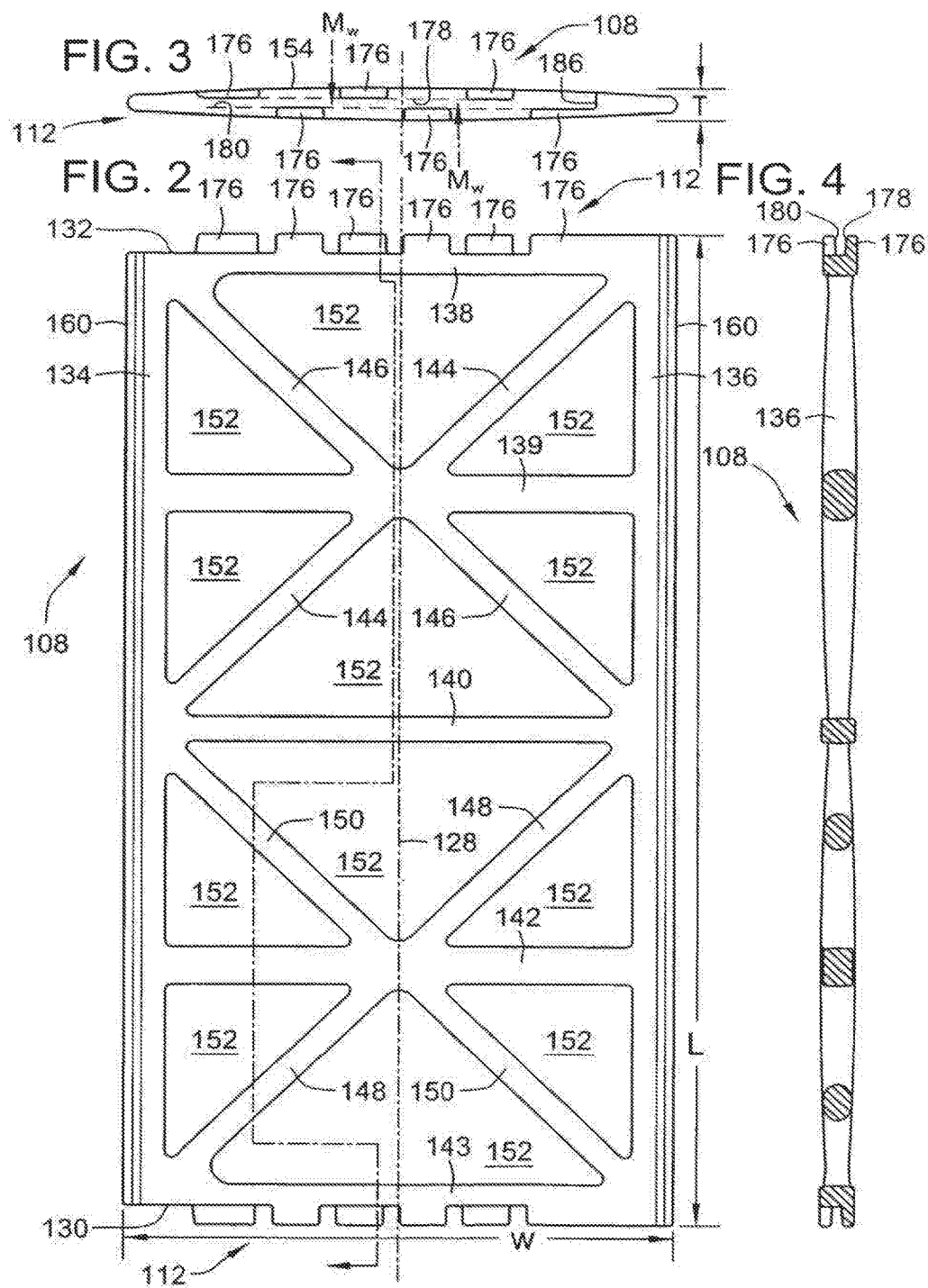

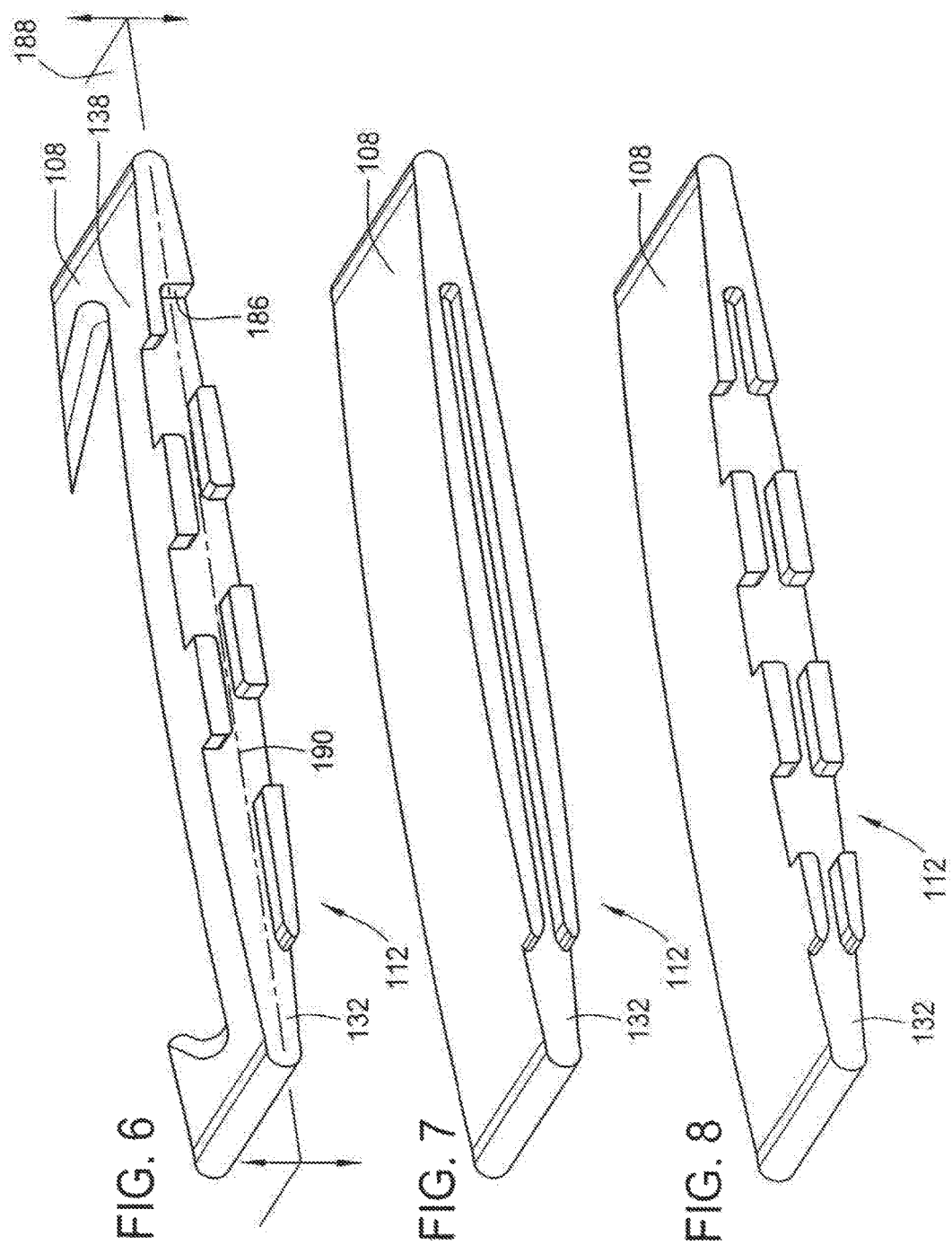

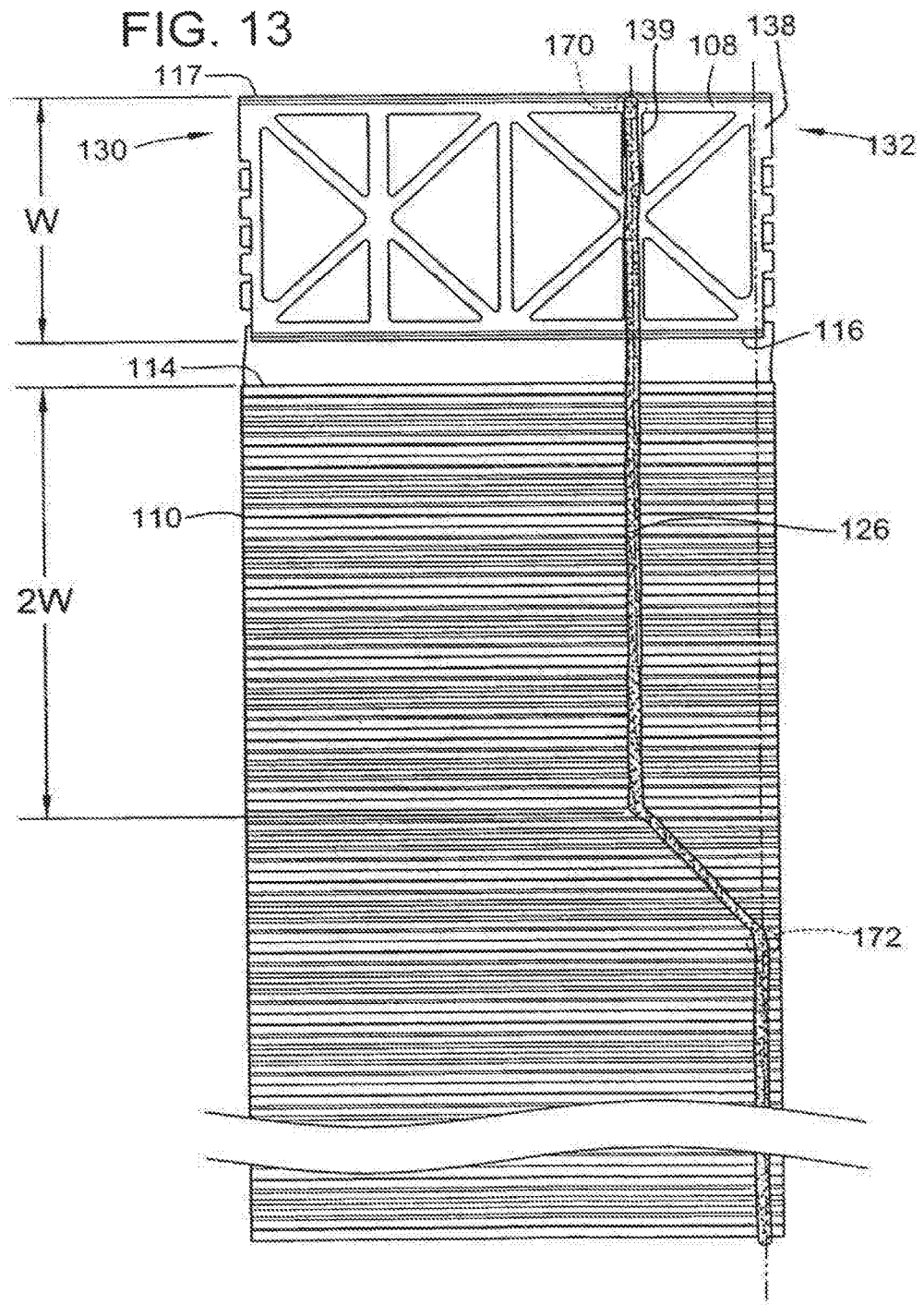

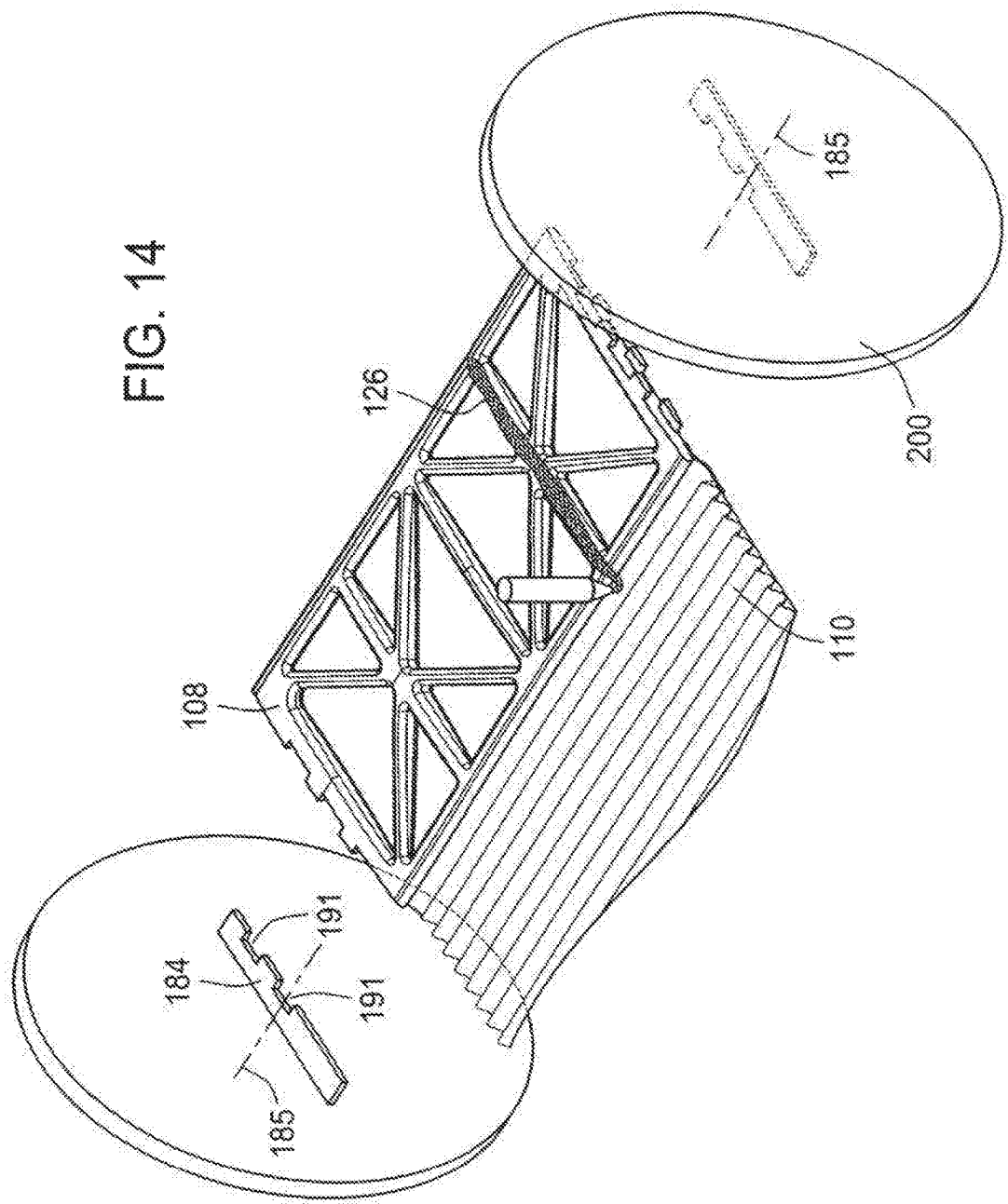

METHOD AND APPARATUS FOR WINDING A FILTER ELEMENT

CROSS-REFERENCE TO RELATED PATENT APPLICATION

This patent application is a divisional of co-pending U.S. patent application Ser. No. 11/634,647, filed Dec. 6, 2006, the entire teachings and disclosure of which are incorporated herein by reference thereto.

FIELD OF THE INVENTION

This invention relates to fluid filters for removing particulate matter from a flow of fluid in liquid or gaseous form, including filters of the type used for filtering inlet air supplied to machinery such as engines and compressors.

BACKGROUND OF THE INVENTION

In one commonly utilized form of a filter element, the filter element defines a longitudinal axis and first and second axial ends of the filter element, with the filter element including a central core, and a length of fluted filter media wound about the central core, with the flutes of the media oriented substantially longitudinal, to thereby provide for filtration of a flow of fluid passing axially through the filter element. Such filter elements are typically installed within a housing, or duct, in such a manner that the filter element can periodically be removed for cleaning or replacement with a fresh filter element. A seal between the filter element and the housing is typically provided, in such a manner that none of the fluid flowing through the housing can bypass the filter element, to thereby ensure that all fluid passing through the housing must enter one axial end of the filter element and exit from the opposite axial end of the filter element.

Where possible, filter elements of the type described above are typically formed into a right circular cylindrical shape, with the filter media being wound about a round central core. In some applications, however, it is necessary to form filter elements into non-cylindrical shapes, to fit space constraints of the particular application. For example, in a so-called "race track shaped" element, the cross-sectional shape of the filter element is race track shaped, having a pair of curved (in some embodiments, semi-circular, ends joined by a pair of straight segments). In such race track shaped filter elements, and in filter elements having other non-circular cross-sectional shapes, such as oval or rectangular, for example, the length of fluted filter material is wound about a non-circular central core. Such non-circular central cores may have cross-sections that are substantially rectangular in shape.

In one prior approach to providing a race track shaped filter element, as disclosed in U.S. Pat. Nos. 7,001,450 B2; 6,746,518 B2 and 6,547,857 B2, to Gieseke et al., fluted filter media is coiled about a rectangular shaped center board. The center board includes a corrugated region, which purportedly helps to hold the fluted media in place during winding of the filter element.

As is well known in the art, and stated in the patents to Gieseke, fluted filter media typically exhibits an inherent shape memory which can cause the media to bow outwardly, radially, away from the center board. In a filter element having a cylindrical central core, this inherent curvature memory is typically not problematic, in that the curvature of the media will not interfere with, and may actually assist in, pulling the media down onto the core, or onto a previously wound layer of the media. For cores in race track shaped elements, however, such as the center board used in the Gieseke patent, the inherent tendency of the filter media to bow outward may make it difficult to create a secure, tight, seal between the first layer of the media and the center board.

According to Gieseke, the corrugations of the center board alleviate this problem because the fluted media is better able to mate with and engage with the corrugations of the center board than with a flat surface. In practice, however, the corrugated section of the center board of Gieseke may, in fact, make it more difficult to achieve the desired fit between the first layer of fluid media and the outer surface of a non-cylindrical core, by interfering with the ability of the media to move freely while being pulled by a winding tensioning force across the surface of the core during the winding operation. In addition, fluted filter media, of the type typically used in such filter elements, is fabricated from layers of paper-like material by processes which are not amenable to accurate control of dimensional tolerances, with the result being that, in actual practice, the fluted media may not fit well into the corrugations of the center board, thereby causing an additional tendency of the first layer of media to be pushed outward away from the surface of the center board.

As a further difficulty, the corrugations of Gieseke must be closely matched to a given flute profile, thereby making it difficult to utilize different flute spacing and shapes with a given center board, which in turn can drive up inventory and manufacturing costs. Because filter elements of this type are often disposable, so that they may be readily replaced at appropriate intervals, additional manufacturing complexity and cost, resulting in increase replacement cost of the element, is highly undesirable and can be a significant detriment to successful competition in the marketplace.

Because the central core, in a wound filter element, is essentially a non-operating part of the completed filter, it is desirable that the central core be fabricated at minimal cost, utilizing as little material as possible, and have a configuration which can be readily manufactured in a form that is also readily disposable or incinerable. It is also desirable, in some applications, that the central core be fabricated in a manner which is as light in weight as possible. The center board of the Gieseke patent does not meet these requirements. Although the center board of Gieseke includes a number of holes extending through the thickness of the center board, the center board of Gieseke includes considerable surplus material. This condition is exacerbated by the inclusion of the corrugated section.

The center board of Gieseke also discloses a cutout, at one end of the center board, to be held by a spindle during winding of the filter element. The configuration of the cutout of Gieseke is an inefficient drive mechanism, in that the winding torque from the spindle is apparently applied only to the sidewalls of the cutout, which are located closely adjacent to the winding axis and essentially formed by the thickness of the center board. Such an inefficient drive mechanism may make it difficult to apply sufficient winding torque, without damaging the center board, to maintain a winding tension in the filter media which is high enough to pull the media into intimate contact with the outer surface of the center board or previously wound layers of media.

Another prior approach to forming a race track shaped filter element is shown in U.S. Pat. Nos. 7,008,467 B2 and 6,966,940 B2, to Krisko et al. Krisko uses a core construction including a race track shaped non-cylindrical, imperforate, wall member, having opposing walls defining an open volume within the imperforate non-cylindrical member. In cross section, the non-cylindrical member has the appearance, generally, of a flattened cylindrical-shaped tube having flat opposing side walls joined at opposite ends by curved walls, surrounding the open volume. The opposing walls and ends of the non-cylindrical member of the core construction of Krisko are imperforate. The core construction of Krisko further includes structural moldings and plugs located within the open volume, for providing strength, and axially closing off the open volume to ensure that fluid cannot leak through the open volume inside of the non-cylindrical member.

The central core construction of Krisko is even more complex than the center board of Geiseke, as described above. The core construction of Krisko also appears to include a substantial volume of excess material, making such a core construction undesirably expensive to produce and heavier than necessary. The core construction of Krisko also results in a significant amount of extra material which must be disposed of or incinerated when the filter element is replaced.

It is desirable, therefore, to provide an improved method and apparatus for manufacturing a fluid filter element having filter media wound about a non-cylindrical central core, in a manner which overcomes one or more of the problems discussed above, and/or providing improved utility over the prior art.

BRIEF SUMMARY OF THE INVENTION

The present invention provides an improved filter apparatus and method, through utilization of a filter element having a length of filter media wound about a winding structure which includes a winding feature extending substantially outward from an axial end of the winding structure. The length of filter media is wrapped about the winding structure in such a manner that the axial end of the filter element is disposed substantially flush with a distal end of the winding feature. In some forms of the invention, the winding structure may be a substantially open, truss-like structure.

In some forms of the invention, a filter element includes a length of filter media wound about a winding structure, with the filter element defining a longitudinal axis and an axial end of the filter element, when the filter media is wound about the winding structure. The winding structure has an axial end thereof disposed adjacent the axial end of the filter element. The winding structure also includes a winding feature extending substantially axially outward from the axial end of the winding structure to a distal end of the winding feature. The length of filter media is wrapped about the winding structure in such a manner that the axial end of the filter element is disposed substantially flush with the distal end of the winding feature.

In some forms of the invention, the winding feature of the winding structure may take the form of one or more lugs forming at least one guide surface extending substantially along the width of the winding structure, for applying a winding force to the width of the winding structure, to thereby generate a winding moment or torque applied to the winding structure.

In some forms of an apparatus and/or method, according to the invention, the winding feature of the winding structure may include a stop for positioning the winding structure transversely with respect to a winding axis.

A filter element, according to the invention, may define a longitudinal axis and first and second axial ends of the filter element, and include a winding structure and a length of fluted filter media wound about the winding structure with flutes of the media oriented substantially parallel to the longitudinal axis, to thereby provide for filtration of a flow of fluid passing substantially parallel to the longitudinal axis through the filter element. The winding structure may define a winding structure axis extending substantially parallel to the longitudinal axis of the filter element, and oppositely facing axial ends of the winding structure disposed at opposite ends of the winding structure along the winding structure axis adjacent the corresponding first and second axial ends of the filter element. The winding structure may have a length, width and thickness thereof, with the length extending substantially along the winding structure axis between the first and second axial ends of the winding structure, the width extending substantially orthogonally to the winding structure axis, and the thickness extending substantially orthogonally to both the winding structure axis and the width of the winding structure. The winding structure may also include a winding feature extending substantially axially outward from at least one of the axial ends of the winding structure. The winding feature is configured for receiving a winding torque, applied to the winding structure, for rotation of the winding structure about a winding axis extending substantially parallel to the longitudinal axis of the filter element, as the media is wound onto the winding structure.

The invention may take the form of a method for constructing a filter element, having a length of filter media wound about a winding structure, in such a manner that the filter element defines a longitudinal axis and an axial end of the filter element, with the length of filter media having an edge thereof which substantially defines the axial end of the filter element when the filter media is wound about the winding structure. The winding structure may be configured to have an axial end thereof disposed adjacent the axial end of the filter element, with the winding structure including a winding feature extending substantially axially outward from the axial end of the winding structure to a distal end of the winding feature. The method may include wrapping the length of filter media about the winding structure in such a manner that the axial end of the filter element is disposed substantially flush with the distal end of the winding feature.

Where the winding feature of a winding structure, according to the invention, further defines a stop for positioning the winding structure transversely with respect to the winding axis, a method, according to the invention, may further include using the stop of the winding feature for transversely positioning the winding structure with respect to the winding axis.

A method, according to the invention, may further include applying a winding torque to the winding feature for rotation of the winding structure about a winding axis extending substantially parallel to the longitudinal axis of the filter element, for winding the media onto the winding structure. The method may further include engaging the winding feature with a winding machine in a manner allowing the winding torque to be applied to the winding feature.

Where the winding machine includes a mandrel having a driving feature, and the winding feature of the winding structure includes one or more lugs forming at least one transversely oriented guide surface for operatively engaging the driving feature of the mandrel, a method, according to the invention, may further include operatively engaging the driving feature of the mandrel with the transversely oriented guide surface formed by the one or more lugs of the winding feature of the winding frame. Where the mandrel defines a drive axis lying substantially coincident with the winding axis, as the media is wound onto the winding structure, the transversely oriented guide surface and driving features may be cooperatively configured for sliding engagement of the guide surface with the driving feature, as the winding structure is guided in a transverse direction toward the driving axis. With such a structure, a method, according to the invention, may further include operatively engaging the drive feature with the transversely oriented guide surface by sliding the guide surface over the driving feature to a point where the winding axis is substantially coincident with the driving axis. In forms of the invention where the winding feature of the winding structure further includes a stop for engaging the driving feature to limit relative sliding motion between the winding structure and the mandrel, in such a manner that the winding axis is substantially coincident with the driving axis when the stop is substantially abutting the driving feature, a method, according to the invention, may further include bringing the stop into substantial abutment with the driving feature.

A filter apparatus and/or method, according to the invention, may include a filter element, having a winding structure in the form of a winding frame, and a length of fluted filter media wound about the frame with the flutes of the media oriented substantially longitudinally, to thereby provide for filtration of a flow of fluid passing axially through the filter element. In some forms of the invention, the winding frame is a substantially open, truss-like structure. Use of a winding frame, rather than the center boards or other types of cores used in prior filter elements, provides a number of advantages, including, but not limited to improvements in manufacturability and operational capability and improved environmental friendliness of the filter element.

In some forms of the invention, a filter element defines a longitudinal axis and first and second axial ends of the filter element. A winding frame, of the filter element, defines a frame axis extending substantially parallel to the longitudinal axis of the filter element, and first and second oppositely facing axial ends of the winding frame disposed at opposite ends of the winding frame along the frame axis. The winding frame defines a length, width and thickness thereof, with the length extending substantially along the frame axis between the first and second axial ends of the winding frame, the width extending substantially orthogonally to the frame axis, and the thickness extending substantially orthogonally to both the frame axis and the width of the winding frame. A length of fluted filter media is wound about the winding frame with the flutes of the fluted media oriented substantially longitudinally to the frame axis, to thereby provide for filtration of a flow of fluid passing substantially parallel to the longitudinal axis through the filter element. The winding frame may be substantially open through the thickness thereof and across the width thereof. The winding frame may also be a truss-like structure.

A winding frame, according to the invention, may include first and second longitudinally extending side rails joined in a transversely spaced relationship to one another and to the frame axis by one or more cross-members extending transversely to the frame axis across the width of the winding frame. The transversely extending cross-members may be oriented substantially perpendicular to the frame axis, or at an angle to the frame axis, or some combination thereof. The cross-members may be substantially straight, or curved, or some combination thereof. The side rails and cross-members of the winding frame may define open areas, disposed between the side rails, and extending through the thickness of the frame. The side rails of the frame may be joined together by a plurality of cross-members to form a truss-like structure.

In some forms of the invention, the thickness of a winding frame, according to the invention, may have a substantially oval cross-section defining a maximum sectional thickness between the side rails and converging to lesser sectional thickness at each side rail. The cross-section of the frame may define a substantially smooth outer peripheral surface having opposed central sections of larger radius disposed between the side rails, joined by straight sections to small radius sections at the lateral edges of the frame and forming outer longitudinally extending edges of the side rails. Where the length of fluted filter media wound around the frame defines a series of alternating peaks and valleys forming flutes, the small radius sections of the outer peripheral surface of the winding frame may be configured to be closely embraced and gripped by the peaks of two or more adjacent flutes of the first layer of the filter media lying against the outer peripheral surface of the winding frame.

In some forms of the invention, a small radius section of one of the frame rails, in a winding frame according to the invention, may define a leading edge of the frame. The filter element may further include a strip of tape for joining the leading edge of the length of filter material to the winding frame in such a manner that the leading edge of the media is attached to the frame without being substantially wrapped around the leading edge of the frame. The leading edge of the media may be formed by cutting the media substantially along the peak of one of the flutes thereof to form a resulting half-peak, and the half-peak may be filled with an adhesive sealant.

At least one cross-member of a winding frame, according to the invention, may be joined to the filter media, of a filter element according to the invention, by a layer of adhesive/sealant, to thereby preclude fluid communication between the axial ends of the filter element along the juncture of the media with the peripheral surface of the frame.

A winding frame, according to the invention, may include a cross-member forming an axial end of the frame, and a winding feature extending substantially axially outward from the axial end of the frame, with the winding feature being configured in a manner allowing a winding torque to be applied to the frame, for rotation of the frame about a winding axis oriented substantially parallel with the frame axis, as the media is wound onto the frame. The winding feature of the frame may include one or more lugs forming at least one guide surface extending substantially along the width of the winding frame, for applying a winding force to the width of the frame for generating the winding torque. The winding feature of the frame may further define a stop for positioning the frame transversely with respect to the winding axis.

A winding frame, according to the invention, may be configured about a parting plane extending through the width of the frame, and dividing the thickness of the frame in such a manner that the frame can be formed in a two-piece mold, having a parting line coincident with the parting plane.

The invention may also take the form of a method for constructing a filter element defining a longitudinal axis and first and second axial ends of the filter element. Such a method may include wrapping a length of filter media about a winding frame, according to the invention.

A method, for constructing a filter element including a winding frame having a substantially oval cross-section with small radius sections at outer edges of the winding frame, according to the invention, may include attaching the leading edge of a length of media to the frame, and while applying a winding tension to the media, rotating the frame about a winding axis through a first rotation of the frame in such a manner that the peaks of two or more adjacent flutes of a first layer of the filter media lying against the outer peripheral surface of the winding frame closely embrace and grip one of the small radius sections of the outer peripheral surface of the frame.

Where a winding frame, according the invention, is a substantially open truss-like structure having axial ends thereof and at least one cross-member spaced inward from the axial ends, a method, according to the invention, may include initially applying a bead of adhesive/sealant to the cross-member spaced inward from the axial ends of the frame, and then, after wrapping the media at least once completely about the frame, moving the bead of adhesive/sealant closer to an axial end of the frame, to thereby increase the active area of media located between the axial ends of the filter element, while joining the filter media to the frame by a layer of adhesive/sealant in a manner precluding direct fluid communication between the axial ends of the filter element along the juncture of the media with the frame, or between successive layers of the media.

A method, according to the invention, may further include applying a winding moment to the guide surface of a winding feature of a winding frame, according to the invention, in a direction substantially orthogonal to the frame axis and the width of the frame. The winding moment may be applied to the guide surface of the winding feature with a driver that is rotatable about a drive axis and has one or more lugs forming at least one drive surface oriented and cooperatively configured for operatively engaging the guide surface of the frame. Prior to wrapping the media about the frame, the driver may be engaged with the guide surface of the frame by sliding the guide surface over the drive surface to a point where the winding axis of the frame is substantially coincident with the drive axis. Subsequent to wrapping the media about the frame, the method may include releasing the filter element by moving the driver axially along the drive axis away from the filter element.

Where a winding feature of a winding frame, according to the invention, includes a stop for engaging a driver, to thereby position the frame axis substantially coincident with a drive axis of the driver when the stop is substantially abutting the driver, a method, according to the invention, may include bringing the stop substantially into abutment with the driver.

A method, according to the invention, may include forming a winding frame in a two piece mold having a parting plane extending through the width of the winding frame and dividing the thickness of the frame in such a manner that the frame has a parting line coincident with the parting plane.

Other aspects, objectives and advantages of the invention will be apparent from the following detailed description taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 2-5 are orthographic views of the winding frame of the exemplary embodiment of the filter element shown in FIG. 1;

FIG. 6 is a perspective view of an exemplary embodiment of a winding feature of the winding frame shown in the exemplary embodiment of the filter element of FIG. 1;

FIGS. 7 and 8 are alternate embodiments of a winding feature, in accordance with the invention, of a winding structure according the invention;

FIG. 13 is a rolled-out illustration of the manner of applying a bead of adhesive/sealant during construction of the exemplary embodiment of the filter element shown in FIG. 1; and FIG. 14 is a alternate embodiment of an apparatus for constructing the exemplary embodiment of the filter element shown in FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
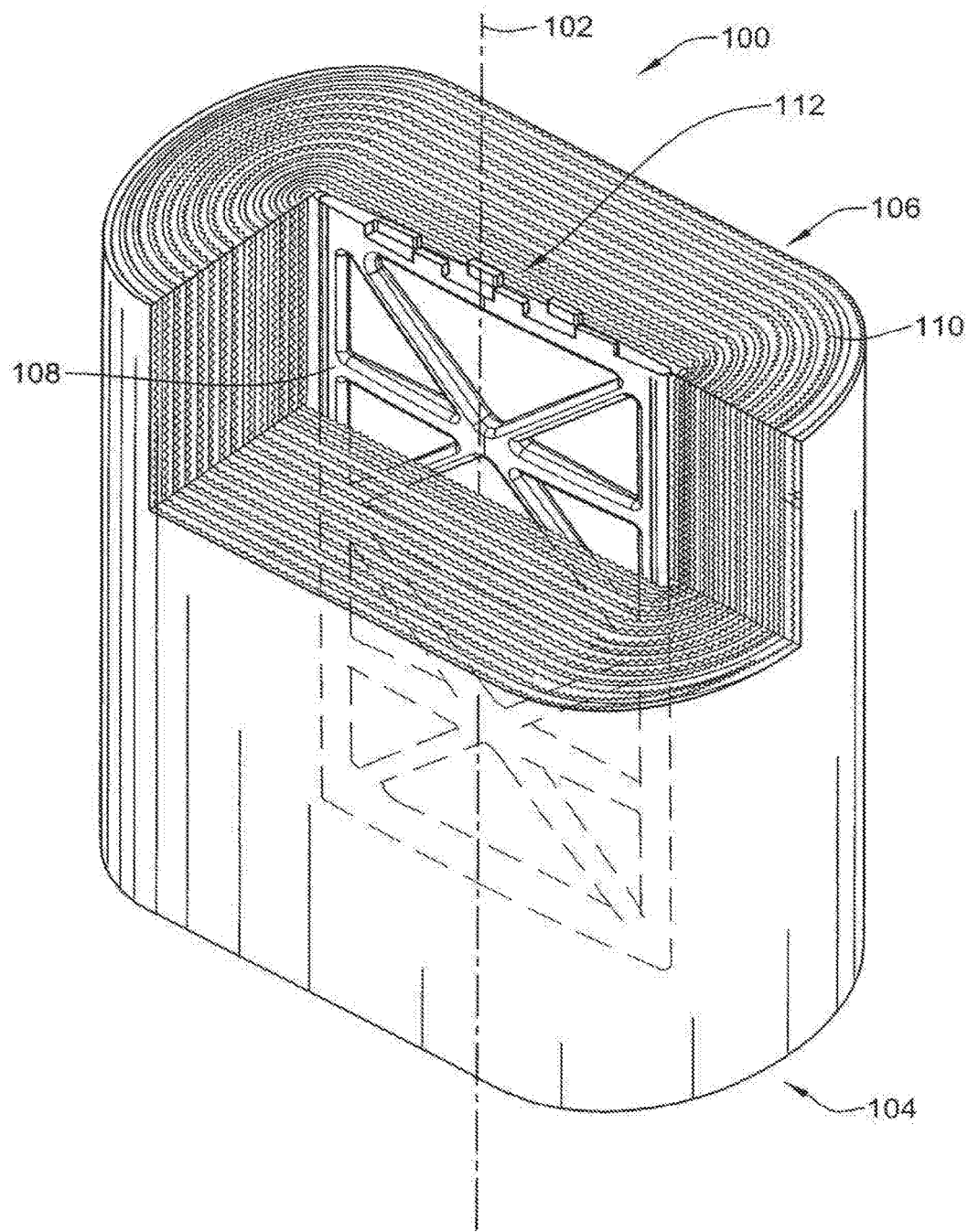
FIG. 1 is a perspective illustration of an exemplary embodiment of a filter element, according to the invention having a length of fluted filter media wrapped about a winding structure in the form of a winding frame.

FIG. 1 shows a first exemplary embodiment of the invention in the form of a filter element 100 defining a longitudinal axis 102 and first and second axial ends 104, 106 of the filter element 100. The exemplary embodiment of the filter element 100 includes a winding structure, in the form of a winding frame 108, and a length of fluted filter media 110 wound about the frame 108, with the flutes of the fluted filter media being oriented substantially longitudinally to the longitudinal axis of the filter element 100, to thereby provide for filtration of a flow of fluid passing axially through the filter element 100.

As shown in FIGS. 1-7, and described in more detail below, the winding frame 108 of the exemplary embodiment 100 of the filter element is a substantially open, truss-like structure, having a smooth advantageously shaped outer periphery, allowing the media 110 to be effectively pulled into intimate contact with the outer periphery of the winding frame 100 by a winding tension force applied to the media 110, during construction of the filter element 100. The frame 108 also includes a pair of winding features 112, extending substantially axially outward from opposite axial ends of the frame 108, and configured in a manner allowing a winding torque to be applied to the frame 108, for rotation of the frame about a winding axis extending substantially parallel to the longitudinal axis 102 of the filter element, as the media 110 is wound onto the frame 108. As will be understood from the detailed description below, the winding features 112 of the winding frame 108 of the exemplary embodiment of the filter element 100 are configured to interface with a driver element of a winding machine in a manner facilitating attachment and alignment of the winding frame 108 with the driver, and for allowing a winding torque from the driver to be transmitted more efficiently and effectively to the winding frame 108 then was achievable with the center boards and core constructions of prior filter elements.

As shown in FIGS. 9-14, and described in greater detail below, a leading edge 114 of the length of fluted filter media 110 is joined to a leading edge 116 of the winding frame 108 by a length of securing tape 118. The leading edge 114 of the fluted filter media 110 is cut on a peak 120 of the fluted media 110, to create a half peak 122 of the media 110 opening outward toward the leading edge 114 of the media. The half peak 122 is filled with a bead of adhesive sealant 124, to preclude leakage of fluid longitudinally through the half peak 122 from the first to the second axial ends 104, 106 of the filter element 100. The filter media 110 is further secured and sealed to the frame 108, and between successive layers of the filter media 110 by an additional bead of adhesive/sealant 126, applied in a manner described in more detail below.

As will be understood, by those having skill in the art, utilization of a winding frame, in accordance with the invention, for constructing a filter element, provide significant advantages over the prior art, for fabricating a filter element in an efficient and effective manner without resorting to counter-productive machinations, such as the corrugated bearing surface of the center board or complex core constructions utilized in the prior art.

It is contemplated that, in practicing the invention, fluted filter media of conventional construction, as described, for example, in U.S. Pat. No. 3,025,963 to Bauer, unconventional fluted filter media of the type described in commonly assigned U.S. patent application Ser. No. 10/979,390 to Driml, et al., and Ser. No. 10/979,453 to Merritt, et al., for example, or any other appropriate type of fluted filter media, may be utilized, with the disclosure and teachings of the aforementioned patent to Bauer and applications to Driml and Merritt being incorporated herein in their entireties by reference.

As shown in FIGS. 2-4, the winding frame 108 defines a frame axis 128 extending substantially parallel to the longitudinal axis 102 of the filter element 100. The frame 108 further defines first and second oppositely facing axial ends 130, 132 of the winding frame 108, disposed at opposite ends of the winding frame 108 along the frame axis 128. The winding frame 108 further defines a length "L", width "W" and thickness "T" of the winding frame 108, with the length L extending substantially along the frame axis 128 between the first and second axial ends 130, 132 of the frame 108, the width W extending substantially orthogonally to the frame axis 128, and the thickness T extending substantially orthogonally to both the frame axis 128 and the width W of the winding frame 108.

The winding frame 108, of the exemplary embodiment of the filter element 100, includes first and second longitudinally extending side rails 134, 136, joined in a transversely spaced relationship to one another and the frame axis 128 by a plurality of cross members 138-140, 143, 144, 146, 148, 150, extending transversely to the frame axis 128 across the width W of the winding frame 108. As shown in FIG. 2, several of the cross members 138, 139, 140, 142, 143, extend generally perpendicularly to the side rails 134, 136 and frame axis 128. Other cross members 144, 146, 148, 150, extend transversely between the first and second side rails 134, 136 in an angular relationship to the side rails 134, 136 and frame axis 128.

As will be appreciated, from an examination of FIG. 2, the arrangement of the side rails 134, 136 and cross-members 138, 139, 140, 142, 143, 144, 146, 148, 150, are joined together to form a truss-like structure defining a plurality of open areas 152 disposed between the side rails 134, 136 and extending through the thickness T of the frame 108. The truss-like structure of the frame 108 provides for a very efficient and effective use of the material, from which the frame 108 is fabricated, in a manner providing a structure which is significantly lighter in weight than the center boards or core constructions of prior filter elements, to thereby reduce manufacturing costs providing better utilization of scarce natural resources, and also providing a structure which is more amenable to recycling and incineration than the center boards and core constructions of prior filter elements.

Figure 5:
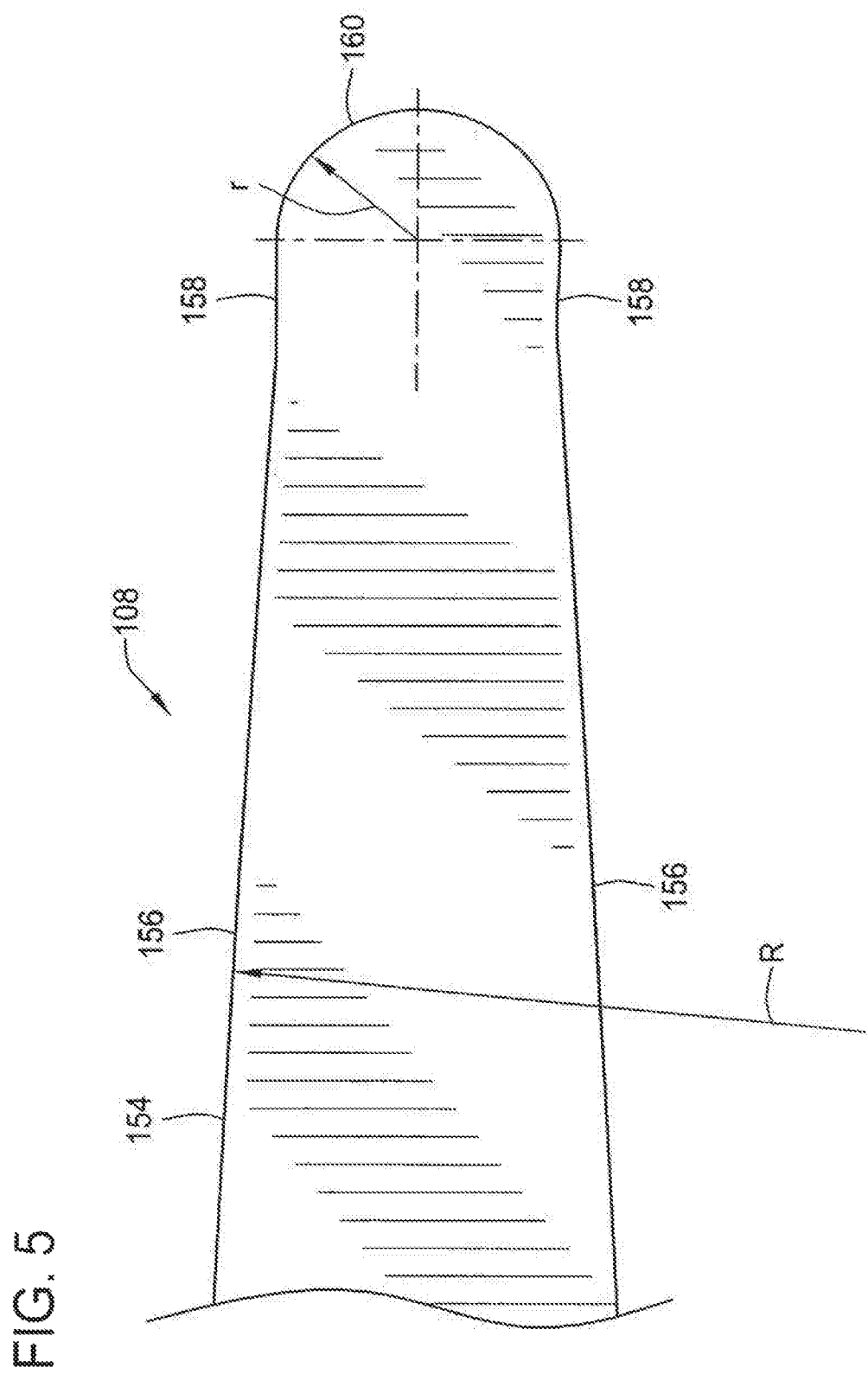

As shown in FIGS. 3 and 5, the frame thickness T has a substantially oval cross section, having a maximum sectional thickness between the side rails 134, 136 and converging to a lesser sectional thickness at each side rail 134, 136. The cross section of the frame 108 defines a substantially smooth outer peripheral surface 154 having opposed central sections 156 of larger radius "R" disposed between the side rails 134, 136, joined by straight sections 158 to small radius "r" sections 160 forming outer longitudinally extending edges of the side rails 134, 136.

Figure 9:
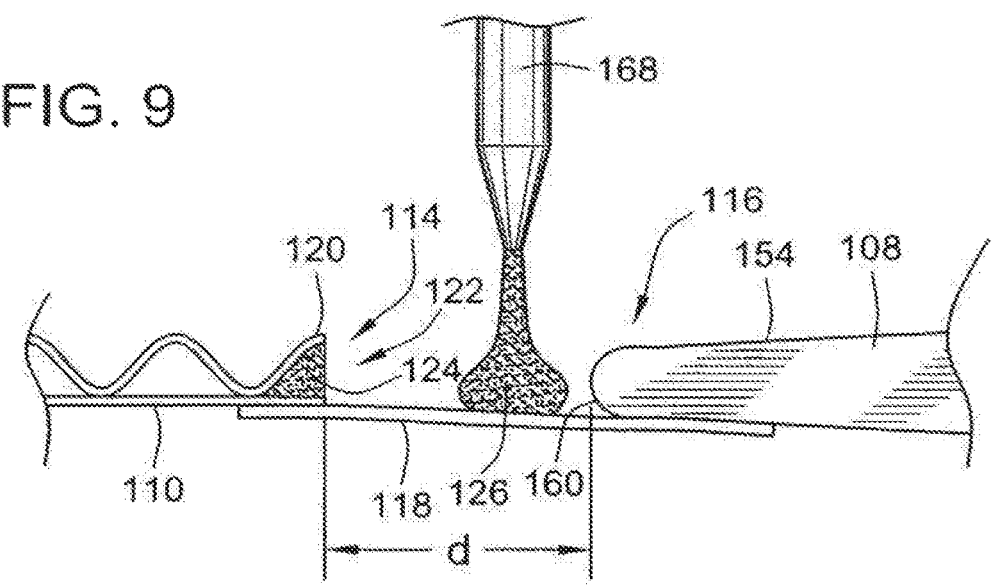
FIGS. 9-11 are illustrations of the attachment of leading and trailing edges of the filter media to a leading edge and a trailing edge, respectively, of the winding frame in the exemplary embodiment of the filter element shown in FIG. 1.
Figure 10:
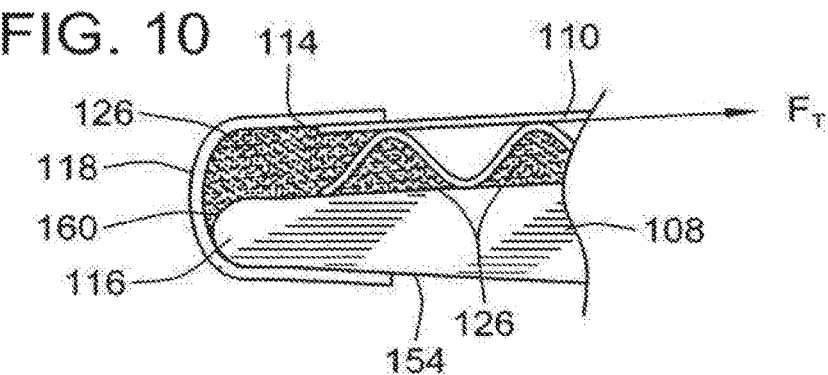
Figure 12:
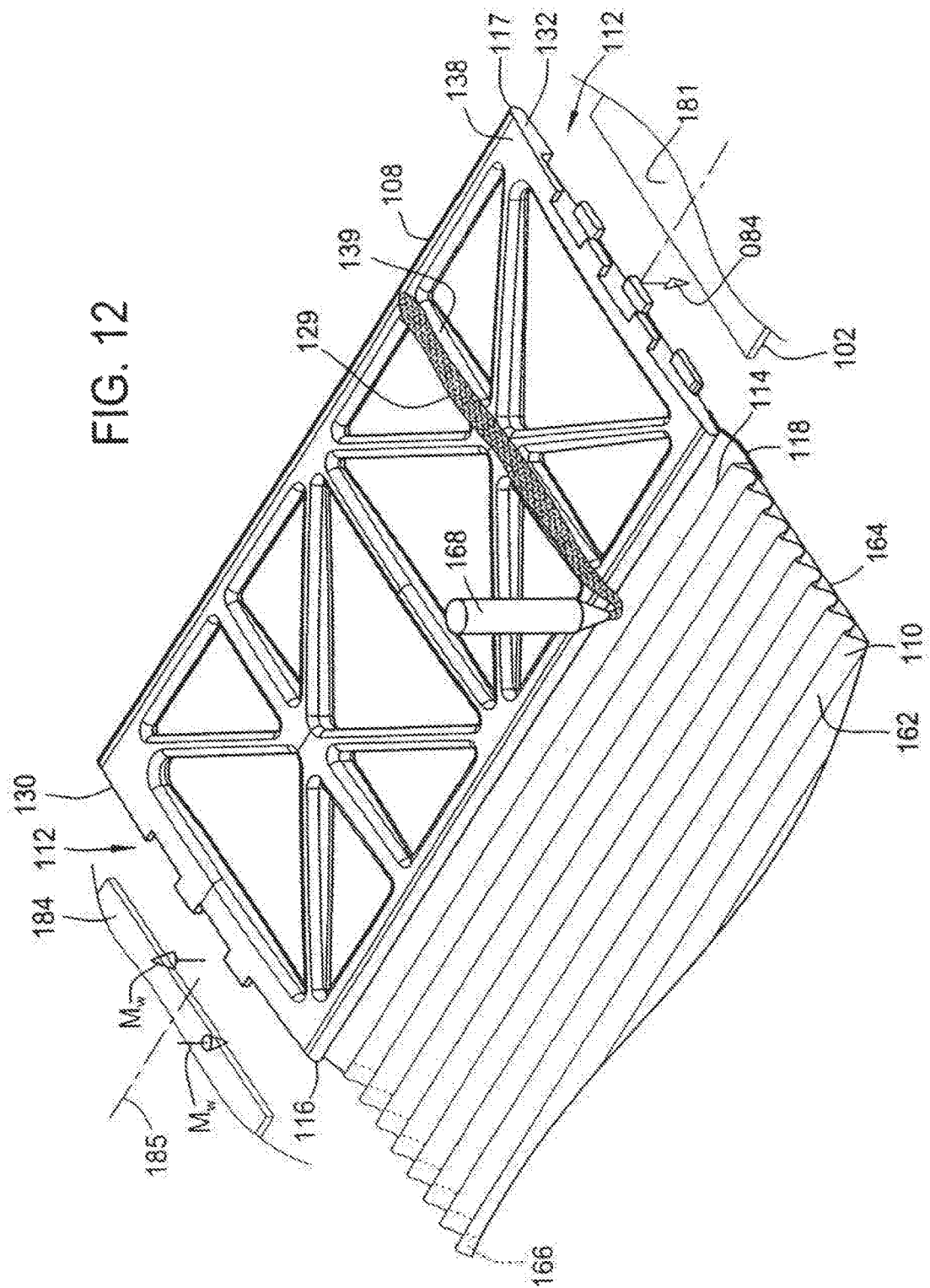
FIG. 12 is a perspective illustration of details of construction of the exemplary embodiment of the filter element shown in FIG. 1.

As shown in FIGS. 9 and 12, one of the edges 160 of the frame 108 forms the leading edge 116 of the frame 108, and the other edge 160 of the frame 108 forms a trailing edge 117 of the frame 108. When joining the media 110 to the frame 108 with the tape 118, the leading edges 114, 116 of the media 110 and frame 108 are positioned at a selected spaced distance "d", prior to joining the media 110 to the frame with the tape 118, with the particular spaced distance d being selected in such a manner that the leading edge 114 of the media 110 is brought into contact with the outer peripheral surface 154 of the frame 108 without the media 110 being wrapped around the leading edge 160 of the frame 108, as the frame 108 is rotated about a winding axis substantially coincident with the frame axis 128 and longitudinal axis 102 of the filter element 100. Specifically, as shown in FIG. 10, it is preferred that the spacing d between the leading edges 114, 116 of the media 110 and frame 108 be such that the tape 118 wraps around the edge 160 of the frame in a manner allowing the leading edge 114 of the media 110 to come into contact with the outer peripheral surface 154 of the frame 108 along the straight section 158 or the large radius curve section 154 of the frame 108. By virtue of this arrangement, the need for bending the media 110 around the leading edge 116 of the frame is eliminated, with the tape 118 providing a secure attachment of the media to the frame in such a manner that a relatively high winding tensile force $F_T$ may be applied to the media 110 during the winding operation, in order to ensure that the media 110 is pulled into intimate contact with the winding frame 108 as the first layer of media 110 is applied, and into intimate contact with a previously wound layer of media 110 as the winding process continues.

As shown in FIG. 12, in the exemplary embodiment of the filter element described herein, the filter media 110 includes an undulating sheet 162 of porous filter material joined to a backing sheet 164. The spaces between the undulating sheet 162 and backing sheet 164 at the end of the length of filter media 110 adjacent the first end 104 of the filter element and leading edge 116 of the winding frame 108 are filled with a bead of adhesive/sealant 166, as indicated by dashed lines in FIG. 12, in the manner known in the art.

Figure 11:
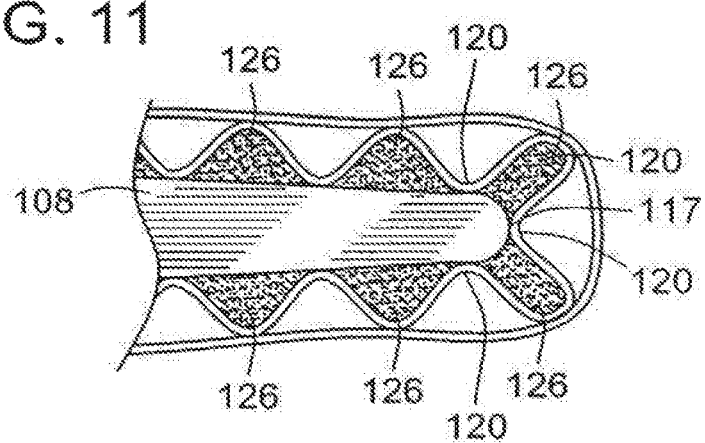

As shown in FIGS. 11-13, as the media 110 is wound onto the frame 108, a second bead of adhesive 126 is applied adjacent the second end 106 of the filter element 108 and 112 of the frame, in such a manner that flutes of the filter media 110 which are not sealed by the bead of adhesive 166 at the first end 104 of the filter are sealed by the second bead of adhesive 126 adjacent the second end of the filter element 100. As is well understood in the art, by virtue of this arrangement, adjacent flutes of the filter media 110 are blocked at opposite ends thereof by the first and second beads of adhesive sealant 166, 162 in such a manner that fluid entering one of the ends 104, 106 of the filter element must pass through the porous filter material of the undulating sheet 162, or the backing sheet 164 where the backing sheet is also made of porous filter material, into an adjacent flute in order to exit the filter element 100 at the opposite end 104, 106 thereof. In passing through the porous filter material in this manner, particulate matter is removed from the fluid and trapped within the filter media 110.

As shown in FIGS. 2, 12 and 13, one cross member 139 of the frame 108 is spaced inward from the second axial end 132, and is adapted for receiving the bead 126 of adhesive sealant during the first revolution of the frame 108, as the first layer of media 110 is being wound onto the frame 108. As indicated in FIG. 9, and in the rolled-out view of FIG. 13, the bead 126 of adhesive sealant is applied by an applicator 168.

As shown in FIGS. 11-14, in the exemplary embodiment 100, the applicator 168 is initially positioned at a distance from the second end of the frame 108 substantially equal to the distance at which the cross member 139 is spaced from the second end 132. The applicator 168 begins dispensing the bead 126 of adhesive/sealant onto the cross member 139, adjacent the trailing edge 117 of the winding frame 108, as shown in FIG. 13, at a first axial location 170, as indicated in FIG. 13. The applicator 168 then moves longitudinally across the frame 108 and along the media 110 a distance 2W, which is substantially equal to twice the width W of the frame 108, while continuing to dispense the bead of adhesive/sealant 126. In this manner, the bead of adhesive/sealant 126 is initially applied across the cross member 139 of the frame 108, in such a manner that a double-thick bead of adhesive/sealant is applied along the upper side (as shown in FIGS. 11-14) of the cross member 139 of the frame 108, and a single bead of adhesive sealant is applied along the lower side (as oriented in FIGS. 11-14) of the cross member 139 of the frame 108, as the frame 108 is rotated about the frame axis 128 to begin winding the media 110 onto the frame 108.

As indicated in FIG. 13, after wrapping the media 110 at least once completely about the frame 108, the applicator 168 moves axially toward a second axial position 172 in such a manner that the bead of sealant 126 substantially traces a pattern, shown in the rolled-out view of FIG. 13, onto the media 110.

This approach to applying the bead of sealant 126 is utilized in recognition of the fact that it is difficult to control the flow of adhesive sealant 126 through the applicator 168 from the moment that the flow of adhesive sealant 126 is initiated. By initially applying the bead of adhesive sealant 126 to the cross member 139, rather than attempting to apply it initially to the cross member 138 of the frame 108, the initial uncertainty in the flow rate of the adhesive sealant 126 through the applicator 168 need not be reckoned with further, in order to ensure that the adhesive sealant 126 is not squeezed out of the second end 104 of the filter element between layers of media 110 in a manner that might lead to plugging the open flutes at the second end 106 of the filter element 100. It is desirable, however, to have the second bead of adhesive sealant 126 be primarily located at a second axial position as near as possible to the second end 106 of the filter element 100 to maximize the length of the flutes in the filter element available for passage through the walls thereof of the fluid as it traverses the filter element from one end to the other thereof.

It will be understood, by those having skill in the art, that in other embodiments of the invention, in practicing the invention, the bead of adhesive/sealant 126 may be applied using alternate techniques and apparatuses, consistent with the configuration and desired results described herein. For example, as shown in FIG. 9, in alternate embodiments of the invention, the applicator 168 can alternatively be initially positioned above the tape 118, rather than above the cross member 139, at a distance from the second end of the frame 108 substantially equal to the distance at which the cross member 139 is spaced from the second end 132. The applicator 168 may then begin dispensing the bead 126 of adhesive/sealant onto the tape 118, as shown in FIG. 9, and continue dispensing the bead of adhesive/sealant 126 as the frame 108 is rotated about the frame axis 128. In this manner, the bead of adhesive sealant 126 is initially applied across the cross member 139 of the frame 108, as the cross member 139 is brought into contact with the bead of adhesive sealant 126 previously deposited onto the tape 118 and/or the surface of the media 110, as the frame 108 is rotated about the frame axis 128 to begin winding the media 110 onto the frame 108. The position of the applicator 168 may also be moved transversely and/or longitudinally, in a manner similar to that shown in FIG. 13, to move the location of the bead of adhesive/sealant 126 closer to the second end 106 of the filter element 100, as described above in relation to the exemplary embodiment 100.

As shown in FIG. 11, it is desirable to have the contour of the trailing edge 117 of the frame 108 be configured in such a manner, that as the media 110 is wrapped under winding tension $F_T$ around the frame 108, the peaks 120 of two or more adjacent flutes of a first layer of the filter media 110 are tightly pulled against the outer peripheral surface 154 of the winding frame 108 in such a manner that the media 110 closely embraces and essentially grips the small radius section 160 at the trailing edge 117 of the frame 108. In this regard, it is desirable to have the particular configuration of the edge 160 of the winding frame 108 coordinated with the pitch spacing of the peaks 120 of the media 110, in such a manner that the media 110 can be pulled down into intimate contact with the outer peripheral surface 154 of the frame 108 during application of the first winding layer.

It will be noted, by those having skill in the art, that, by virtue of the fact that the tape 118 at the leading edge 116 of the frame 108 is very thin in comparison to the thickness of the media 110, as the media 110 is further wrapped over the tape 118 at the leading edge 116 of the frame, the second layer of media 110 will lay very tightly and neatly against the outer surface of the first layer of media 110. It will be further noted, that by beginning the feed of adhesive sealant 126 onto the surface of the tape 118 in the distance d between the leading edges 114, 116 of the media and the frame 108, any excess amount of adhesive sealant 126 initially expressed by the applicator 168 will spread longitudinally along the side rail (134 or 136) forming the leading edge 116 of the frame 108 in a manner creating a smooth transition between the tape 118 and the leading edge 114 of the media 110 as it is wrapped onto, and pulled tight against, the outer peripheral surface 154 of the winding frame 108.

Those having skill in the art will recognize that, by virtue of the arrangement described above, the media 110 may be pulled along the smooth outer peripheral surface 154 of the winding frame 108 in a sliding motion leading to a significantly tighter fit between the media and the winding frame 108 than can typically be achieved in prior filter elements having other types of center boards and/or core constructions, and in particular a tighter fit than can be achieved by those center boards having varying areas including corrugated or other surface treatments to engage the flutes of the filter media being used to form the filter element. It will yet further be recognized, that the method of attachment of the leading edge 114 of the filter media to the leading edge 116 of the frame with the longitudinally oriented strip of tape 118, particularly in combination with the manner in which the media is caused to closely embrace and grip the trailing edge 117 of the frame 108 that the attachment between the filter media 110 and frame 108 that is achieved through practice of the present invention provides a substantially stronger attachment than is achieved in prior filter elements, such that a higher winding tensile force $F_T$ may be utilized in forming a filter element, according to the invention, thereby further facilitating construction of a filter element 100, according to the invention.

As best shown in FIGS. 2, 3 and 6, the winding features 112, of the winding frame 108 of the exemplary embodiment of the filter element 100, extend substantially axially outward from cross members 138, 143 respectively forming the first and second axial ends 130, 132 of the frame 108. The winding features 112 at the first and second axial ends 130, 132 of the frame 108 are essentially identical but face in opposite axial directions. Accordingly, the winding feature 112 at the second end of the frame 108 will be specifically described, but it is understood that the winding feature 112 at the first end 130 of the frame 108 is of substantially identical configuration. It will be noted, however, that in other embodiments of the invention, winding features at opposite ends of the frame need not be identical, that a winding feature may be provided at only an axial end of the frame.

The winding feature 112 at the second end 138 of the frame 108, as shown in FIGS. 2-4 and 6, is formed by a plurality of lugs which, in combination define a pair of guide surfaces 178, 180 extending substantially along the width W of the frame 108 in a manner allowing the guide surfaces 178, 180 to slide over corresponding driving surfaces 181, 182 of a pair of drivers 184 of a winding machine (not shown) for applying a driving torque through the drivers 184 to the frame 108 in a manner generating a winding moment to the guide surfaces 178, 180 directed substantially orthogonally to the frame axis 128 and the width W of the frame 108, as indicated by arrows $M_W$ in FIGS. 3 and 12. By applying the winding moment $M_W$ in this manner across the width W of the frame rather than substantially across the thickness of the frame as in prior art filters having a notched center board, a higher winding moment and resulting winding torque can be utilized for winding the media 110 onto the frame 108, which thereby causes a higher winding tensile force $F_T$ to be utilizable to facilitate construction of the filter element 100. As shown in FIGS. 3 and 6, one of the lugs 176 of the winding feature 112 of the exemplary embodiment of the winding frame 108 is further configured to define a stop 186 for engaging the drivers 184, to thereby position the frame axis 128 substantially coincident with the drive axis 185 when the stop 186 is substantially abutting the driver 184.

As will be understood, by those having skill in the art, a driving feature 112, according to the invention, may take a variety of forms, within the scope of the invention, other than the one described above in relation to the exemplary embodiment of the filter element 100. For example, fewer or more lugs may be utilized for forming the winding feature, in the manner illustrated in FIGS. 7 and 8 which show two alternate embodiments. It will also be appreciated that a winding element, according to the invention, and methods for forming and/or utilizing a winding element according to the invention, may also be used in core structure other than the frame-like core 108 described herein with regard to the exemplary embodiment of the filter element 100.

The particular embodiment of the winding feature 112 selected for the exemplary embodiment shown in FIGS. 1-6 was selected because it provides the advantage of allowing the winding frame 108 to be formed in a two piece mold (not shown) having a parting plane 188 extending through the width W of the frame 108 to effectively divide the thickness T of the frame 108 in such a manner that the frame 108 has a parting line 190 coincident with the parting plane 188. In this manner, the embodiment shown in FIG. 6 is more readily moldable, utilizing only a two-piece mold, then the embodiment shown in FIGS. 7 and 8 which would require a mold having additional pieces to form the winding features as illustrated in FIGS. 7 and 8.

As shown in FIG. 14, it may be desirable, in some embodiments of the invention, to have the drivers 184 include notches 191 therein, corresponding to the particular configuration of the winding feature 112, in such a manner that the winding frame 108 need not be moved slidably as far in a lateral direction to engage the drivers 184 and position the frame 108 with respect to the drive axis 185. As further shown in FIG. 14, it may be desirable to provide some sort of rotatable guide 200 at each end of the filter element 100, perhaps as part of a winding mandrel assembly (not shown), in order to facilitate guidance of the media 110 onto the frame 108 during construction of the filter element 100.

In the exemplary embodiment of the filter element 100, it will be noted that the media 110 has a lateral width, in the direction of the longitudinal axis 102 of the filter element 100, which extends beyond the first and second ends 130, 132 of the frame 108, with the distal ends of the lugs 176 of the winding features 112 being disposed substantially flush with the lateral edges of the filter media 110 at the axial ends 104, 106 of the filter element. By virtue of this arrangement, the volume of active filter media 110 is maximized, for a given axial length of the filter element 100. With this arrangement, however, it is not possible to slide the completed filter element 100 off of the drivers 184 in a direction opposite to that in which the frame 108 was slidingly installed onto the drivers 184 prior to winding the filter media 110 around the frame 108. It is contemplated therefore that, in accordance with a method for practicing the invention, subsequent to wrapping the media 110 about the frame 108, the filter element 100 is released from the drivers 184 by moving one or both of the drivers 184 axially along the drive axis 185 away from the filter element 100.

Although the exemplary embodiments described hereinabove, and specifically illustrated in the accompanying drawing figures, show a winding structure, in accordance with the invention, in the form of the winding frame 108, those having skill in the art will recognize that the invention may also be practiced with other forms of winding structures having configurations that do not include one or all of the open areas 152 but still having a winding feature 112, in accordance with the invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for constructing a filter element having a length of filter media wound about a winding structure, wherein, the filter element defines a longitudinal axis and axial end of the filter element, the length of filter media having two axial edges, the winding structure having two axial ends thereof, each axial end of the winding structure disposed adjacent to, and recessed axially inward from, the axial edges of the filter media, the winding structure including winding features on each axial end of the winding structure, each winding feature extending axially outward away from its respective axial end of the winding structure to a distal end of each winding feature, and the length of filter media being wrapped about the winding structure in such a manner that each axial edge of the filter media extends axially beyond a corresponding end of the winding structure and is disposed flush with or beyond the distal end of each winding feature such that no portion of the winding structure extends beyond either axial edge
the method comprising:
wrapping the length of filter media about the winding structure in such a manner that the axial end of the filter element is disposed substantially flush with or beyond the distal end of each winding feature, thereby constructing the filter element.

2. The method of claim 1, wherein, one of the winding feature of the winding structure further defines a stop for positioning the winding structure transversely with respect to winding axis, and the method further comprises, using the stop of the one of the winding feature for transversely positioning the winding structure with respect to the winding axis.

3. The method of claim 1, further comprising, applying a winding torque to the winding feature for rotation of the winding structure about a winding axis extending substantially parallel to the longitudinal axis of the filter element, for winding the length of filter media onto the winding structure.

4. The method of claim 3, further comprising engaging the winding feature with a winding machine in a manner allowing the winding torque to be applied to the winding feature.

5. The method of claim 4, wherein, the winding machine includes a mandrel having a driving feature, the winding feature comprise one or more lugs forming at least one transversely oriented guide surface for operatively engaging the driving feature of the mandrel, and the method further comprises, operatively engaging the driving feature of the mandrel with the at least one transversely oriented guide surface formed by the one or more lugs of the winding feature of the winding structure.

6. The method of claim 5, wherein, the mandrel defines a drive axis lying substantially coincident with the winding axis as the length of filter media is wound onto the winding structure, the at least one transversely oriented guide surface and driving feature are cooperatively configured for sliding engagement of the at least one transversely oriented guide surface with the driving feature as the winding structure is guided in a transverse direction toward the driving axis, and the method further comprises, operatively engaging the driving feature with the at least one transversely oriented guide surface by sliding the at least one transversely oriented guide surface over the driving feature to a point where the winding axis is substantially coincident with the driving axis.

7. The method of claim 6, wherein, the winding feature of the winding structure further define a stop for engaging the driving feature to limit relative sliding motion between the winding structure and the mandrel in such a manner that the winding axis is substantially coincident with the driving axis when the stop is substantially abutting the driving feature, and the method further comprises, bringing the stop into substantial abutment with the driving feature.

8. The method of constructing a filter element of claim 1, wherein the filter element has a length of filter media
   wherein the length of filter media is fluted filter media;
   wherein wrapping the length of filter media about the winding structure includes:
     wrapping the length of filter media around the winding structure with flutes of the length of filter media oriented substantially parallel to the longitudinal axis, to thereby provide for filtration of a flow of fluid passing substantially parallel to the longitudinal axis through the filter element;
     applying a winding torque to the winding structure to rotate the winding structure about a winding axis extending substantially parallel to the longitudinal axis of the filter element, as the length of filter media is wrapped onto the winding structure; and
   the winding structure defining a winding structure axis extending substantially parallel to the longitudinal axis of the filter element; and
   the winding structure having a length, width and thickness thereof, with the length extending substantially along the winding structure axis, the width extending substantially orthogonally to the winding structure axis, and the thickness extending substantially orthogonally to both the winding structure axis and the width of the winding structure.

9. The method of constructing a filter element of claim 8, wherein, the winding structure defines a body thereof having first and second longitudinally extending edges thereof joined in a transversely spaced relationship to one another and the winding structure axis.

10. The method of constructing a filter element of claim 9, wherein the winding structure thickness has a substantially oval cross section, having a maximum sectional thickness between the first and second longitudinally extending edges and converging to a lesser sectional thickness at each of the first and second longitudinally extending edge.

11. The method of constructing a filter element of claim 10, wherein the substantially oval cross section defines a substantially smooth outer peripheral surface having opposed central sections of large radius disposed between the first and second longitudinally extending edges, joined by straight sections to small radius sections forming outer longitudinally extending surfaces of the first and second longitudinally extending edges.

12. The method of constructing a filter element of claim 11, further comprising joining the winding structure to the length of filter media by a layer of adhesive/sealant, to thereby preclude fluid communication between the axial ends of the filter element along the juncture of the length of filter media with the peripheral surface of the winding structure.

13. The method of constructing a filter element of claim 11, wherein, the length of filter media defines a series of alternating peaks and valleys forming the flutes; and gripping the small radius sections of the outer peripheral surface of the winding structure with the peaks of two or more adjacent flutes of a first layer of the length of filter media lying against the small radius sections of the outer peripheral surface of the winding structure.

14. The method of constructing a filter element of claim 13, wherein, the length of filter media defines a leading edge thereof, one of the small radius section of one of first and second longitudinally extending edges defines a leading edge of the winding structure; and further comprising joining the leading edge of the length of filter media to the winding structure with a strip of tape in such a manner that the leading edge of the length of filter media is attached to the winding structure without being substantially wrapped around the leading edge of the winding structure.

15. The method of constructing a filter element of claim 14, further comprising forming a leading edge of the length of filter media by cutting the length of filter media substantially along one of the peaks thereof, to form a resulting half-peak; and filling the half peak with an adhesive sealant.

16. The method of constructing a filter element of claim 8, wherein, the winding feature of the winding structure comprise one or more lugs forming at least one guide surface extending substantially along the width of the winding structure; and the step of applying a winding torque includes applying a winding force to the width of the winding structure to generate the winding torque.

17. The method of constructing a filter element of claim 16, wherein, the winding feature of the winding structure further define a stop for positioning the winding structure transversely with respect to the winding axis.

18. The method of constructing a filter element of claim 17, wherein, the winding structure is configured about a parting plane extending through the width of the winding structure, and dividing the thickness of the winding structure in such a manner that the winding structure can be formed in a two-piece mold having a parting line coincident with the parting plane.

19. The method of constructing a filter element of claim 8, wherein, the winding structure comprises a winding frame having first and second longitudinally extending side rails joined in a transversely spaced relationship to one another and to the longitudinal axis by one or more cross-members extending transversely to the longitudinal axis.

20. The method of constructing a filter element of claim 19, wherein, the winding frame is substantially open through the thickness of the winding structure and across the width of the winding structure.

21. A method for constructing a filter element, the filter element defining a longitudinal axis and first and second axial ends of the filter element, the filter element comprising:

a winding structure, and a length of fluted filter media, having first and second axial ends, wound about the winding structure with the flutes of the length of fluted filter media oriented substantially parallel to the longitudinal axis, to thereby provide for filtration of a flow of fluid passing substantially parallel to the longitudinal axis through the filter element;

the winding structure defining a winding structure axis extending substantially parallel to the longitudinal axis of the filter element, and oppositely facing axial ends of the winding structure disposed at opposite ends of the winding structure along the winding structure axis adjacent and axially inward from the corresponding first and second axial ends of the length of fluted filter media;

the winding structure having a length, width and thickness thereof, with the length extending substantially along the winding structure axis between the first and second axial ends of the winding structure, the width extending substantially orthogonally to the winding structure axis, and the thickness extending substantially orthogonally to both the winding structure axis and the width of the winding structure;

the winding structure also including a winding feature extending substantially axially outward beyond at least one of the axial ends of the winding structure, the winding feature being flush or below an axial end of the length of fluted filter media such that no portion of the winding structure extends beyond either axial end of the length of fluted filter media;

the winding feature being configured for receiving a winding torque, applied to the winding structure, for rotation of the winding structure about a winding axis extending substantially parallel to the longitudinal axis of the filter element, as the length of fluted filter media is wound onto the winding structure; and wherein, the winding feature comprises at least two lugs spaced from one another across the thickness of the winding structure to define a pair of guide surfaces extending substantially along the width of the winding structure, the method comprising:

wrapping the length of fluted filter media about the winding structure in such a manner that the axial end of the filter element is disposed substantially flush with or beyond the distal end of the winding feature, thereby constructing the filter element.

22. The method of claim 21, wherein the winding feature of the winding structure further defines a stop for positioning the winding structure transversely with respect to the winding axis, and the method further comprises, using the stop of the winding feature for transversely positioning the winding structure with respect to the winding axis.

23. The method of claim 21, further comprising, applying a winding torque to the winding feature for rotation of the winding structure about a winding axis extending substantially parallel to the longitudinal axis of the filter element, for winding the length of fluted filter media onto the winding structure.

24. The method of claim 23, further comprising engaging the winding feature with a winding machine in a manner allowing the winding torque to be applied to the winding feature.

25. The method of claim 24, wherein, the winding machine includes a mandrel having a driving feature, the winding feature comprising at least two lugs defining the pair of guide surfaces, at least one of the pair of guide surfaces for operatively engaging the driving feature of the mandrel, and the method further comprises, operatively engaging the driving feature of the mandrel with the at least one of the pair of guide surfaces formed by the one or more lugs of the winding feature of the winding structure.

26. The method of claim 25, wherein, the mandrel defines a drive axis lying substantially coincident with the winding axis as the length of fluted filter media is wound onto the winding structure, the at least one of the pair of guide surfaces and the driving feature are cooperatively configured for sliding engagement of the at least one of the pair of guide surfaces with the driving feature as the winding structure is guided in a transverse direction toward the driving axis, and the method further comprises, operatively engaging the driving feature with the at least one of the pair of guide surfaces by sliding the at least one of the pair of guide surfaces over the driving feature to a point where the winding axis is substantially coincident with the driving axis.

27. The method of claim 26, wherein the winding feature of the winding structure further defines a stop for engaging the driving feature to limit relative sliding motion between the winding structure and the mandrel in such a manner that the winding axis is substantially coincident with the driving axis when the stop is substantially abutting the driving feature, and the method further comprises, bringing the stop into substantial abutment with the driving feature.

28. The method of constructing a filter element of claim 21, wherein the filter element has a length of fluted filter media,
wherein the length of fluted filter media is fluted filter media;
wherein wrapping the length of fluted filter media about the winding structure includes:
wrapping the length of fluted filter media around the winding structure with flutes of the length of fluted filter media oriented substantially parallel to the longitudinal axis, to thereby provide for filtration of a flow of fluid passing substantially parallel to the longitudinal axis through the filter element;
applying a winding torque to the winding structure to rotate the winding structure about a winding axis extending substantially parallel to the longitudinal axis of the filter element, as the length of fluted filter media is wrapped onto the winding structure; and
the winding structure defining a winding structure axis extending substantially parallel to the longitudinal axis of the filter element; and the winding structure having a length, width and thickness thereof, with the length extending substantially along the winding structure axis, the width extending substantially orthogonally to the winding structure axis, and the thickness extending substantially orthogonally to both the winding structure axis and the width of the winding structure.

29. The method of constructing a filter element of claim 28, wherein, the winding structure defines a body thereof having first and second longitudinally extending edges thereof joined in a transversely spaced relationship to one another and the winding structure axis.

30. The method of constructing a filter element of claim 29, wherein the winding structure thickness has a substantially oval cross section, having a maximum sectional thickness between the first and second longitudinally extending edges and converging to a lesser sectional thickness at each of the first and second longitudinally extending edges.

31. The method of constructing a filter element of claim 30, wherein the substantially oval cross section defines a substantially smooth outer peripheral surface having opposed central sections of large radius disposed between the first and second longitudinally extending edges, joined by straight sections to small radius sections forming outer longitudinally extending surfaces of the first and second longitudinally extending edges.

32. The method of constructing a filter element of claim 31, further comprising joining the winding structure to the length of fluted filter media by a layer of adhesive/sealant, to thereby preclude fluid communication between the axial ends of the filter element along the juncture of the length of fluted filter media with the peripheral surface of the winding structure.

33. The method of constructing a filter element of claim 31, wherein, the length of fluted filter media defines a series of alternating peaks and valleys forming the flutes; and gripping the small radius sections of the outer peripheral surface of the winding structure with the peaks of two or more adjacent flutes of a first layer of the length of fluted filter media lying against the small radius sections of the outer peripheral surface of the winding structure.

34. The method of constructing a filter element of claim 33, wherein, the length of fluted filter media defines a leading edge thereof, one of the small radius section of one of first and second longitudinally extending edges defines a leading edge of the winding structure; and
further comprising joining the leading edge of the length of fluted filter media to the winding structure with a strip of tape in such a manner that the leading edge of the length of fluted filter media is attached to the winding structure without being substantially wrapped around the leading edge of the winding structure.

35. The method of constructing a filter element of claim 34, further comprising forming a leading edge of the length of fluted filter media by cutting the length of fluted filter media substantially along one of the peaks thereof, to form a resulting half-peak; and filling the half peak with an adhesive sealant.

36. The method of constructing a filter element of claim 28, wherein, the winding feature of the winding structure comprises the at least two lugs defining the pair of guide surfaces extending substantially along the width of the winding structure; and
the step of applying a winding torque includes applying a winding force to the width of the winding structure to generate the winding torque.

37. The method of constructing a filter element of claim 36, wherein, the winding feature of the winding structure further defines a stop for positioning the winding structure transversely with respect to the winding axis.

38. The method of constructing a filter element of claim 37, wherein, the winding structure is configured about a parting plane extending through the width of the winding structure, and dividing the thickness of the winding structure in such a manner that the winding structure can be formed in a two-piece mold having a parting line coincident with the parting plane.

39. The method of constructing a filter element of claim 18, wherein, the winding structure comprises a winding frame having first and second longitudinally extending side rails joined in a transversely spaced relationship to one another and to the longitudinal axis by one or more cross-members extending transversely to the longitudinal axis.

40. The method of constructing a filter element of claim 39, wherein, the winding frame is substantially open through the thickness of the winding structure and across the width of the winding structure.

\* \* \* \* \*

UNITED STATES PATENT AND TRADEMARK OFFICE
CERTIFICATE OF CORRECTION

PATENT NO. : 10,065,146 B2
APPLICATION NO. : 15/672049
DATED : September 4, 2018
INVENTOR(S) : Steven J. Merritt et al.

Page 1 of 1

It is certified that error appears in the above-identified patent and that said Letters Patent is hereby corrected as shown below:

In the Claims

In Claim 1, Column 15, Line 40, a --,-- should be inserted after the word element.
In Claim 1, Column 15, Line 43, the word "end" should be "ends."
In Claim 2, Column 15, Line 65, the word "feature" should be "features."
In Claim 2, Column 15, Line 67, the word --a-- should be inserted before the word "winding."
In Claim 2, Column 16, Line 1, the word "feature" should be "features."
In Claim 3, Column 16, Line 5, the word "feature" should be "features."
In Claim 4, Column 16, Line 11, the word "feature" should be "features."
In Claim 4, Column 16, Line 12, the word "feature" should be "features."
In Claim 7, Column 16, Line 37, the word "feature" should be "features."
In Claim 8, Column 17, Line 55, the word "feature" should be "features."
In Claim 8, Column 17, Line 62, the word "feature" should be "features."
In Claim 10, Column 17, Line 14, the word "edge" should be "edges."
In Claim 14, Column 17, Line 40, the word "section" should be "sections."
In Claim 31, Column 20, Line 26, the word "longitudinally" should be "longitudinal."
In Claim 34, Column 20, Line 45, the word "section" should be "sections."

Signed and Sealed this
Thirtieth Day of April, 2019

Andrei Iancu
*Director of the United States Patent and Trademark Office*